Patented Aug. 1, 1933

1,920,349

UNITED STATES PATENT OFFICE 1,920,349

PROCESS OF SEPARATING AND ISOLATING THE ACTIVE SUBSTANCES OF THE POSTERIOR LOBE OF THE HYPOPHYSIS

Max Bockmühl and Fritz Lindner, Frankfort-on-the-Main, and Otto Schaumann, Wiesbaden, Germany, assignors to Winthrop Chemical Company, Inc., New York, N. Y., a Corporation of New York No Drawing. Application August 20, 1930, Serial No. 476,712, and in Germany September 7, 1929

4 Claims. (Cl. 167—74.)

The present invention relates to a process of separating and isolating the active substances of the posterior lobe of the hypophysis from solutions containing a mixture of the active substances.

In the "Journal of the American Chemical Society" volume 50, page 573 (1928) a process is described for separating the active substances of the posterior lobe of the hypophysis. The process consists in extracting the dry substance with dilute acetic acid, mixing the extract solutions concentrated by evaporation with ammonium sulfate, extracting the precipitate thus formed with glacial acetic acid and subjecting the solution obtained to a fractionated treatment with organic solvents. The execution of this process is, therefore, complicated, especially with regard to the production on a technical scale.

Now we have found that the active substances of the posterior lobe of the hypophysis can be separated in a technically simple manner by subjecting solutions practically free from albumin, which contain the active substances of the posterior lobe, to a fractionated treatment with adsorbents. The crude solutions can be freed from albumin by means of the usual agents for eliminating albumin. The treatment of the crude solutions with bentonite has proved to be particularly appropriate, the albumin being adsorbed together with the active substances. The active substances practically free from albumin can again be dissolved from the adsorbate by elutriating with dilute acid. By the fractionated treatment of the solutions free from albumin with adsorbates, almost only the substance increasing the blood-pressure is adsorbed, whilst the substance acting on the uterus mostly remains in solution. The degree of separation of the active substances depends on the choice of the adsorbing agent and the quantities used. Silicic acid and certain silicates have proved best, for instance the bentonite of commerce. Since an excess of the adsorbing agent can, of course, also adsorb the substance acting on the uterus, there is preferably found out in a pre-test that quantity of adsorbing agent effecting the utmost adsorption of the substance acting on the blood-pressure. Also the choice of the hydrogen ion concentration depends on the adsorbing agent used and is preferably found in a pre-test. The process can be carried out either by effecting the separation with a single addition of the adsorbing agent, or it may, however, be advantageous, with regard to a more complete separation of the active substances and for obtaining better yields, to use the adsorbing agent, instead of in a single operation, in several phases with correspondingly smaller quantities. The first mode of execution has the advantage that in a single working operation nearly a quantitative separation of the active substances can be effected, small losses of substance acting on the uterus being, however, unavoidable. The second process entails a more complicated operation, but has the advantage, that the losses of substance acting on the uterus are only small.

The substance acting on the blood-pressure contained in the adsorbent may be dissolved and isolated therefrom by means of suitable solvents.

The following examples serve to illustrate the invention, but they are not intended to limit it thereto.

(1). A solution, containing per cc. 60 units of both the substances of the posterior lobe of the hypophysis, is brought to pH=6.4. Every 10 cc. of this solution are shaken with:

(a) gram of bentonite_____ 0.125
(b) gram of bentonite_____ 0.1
(c) gram of bentonite_____ 0.05
(d) gram of bentonite_____ 0.025

The adsorbates, that is to say the adsorbents containing the substance acting on the blood-pressure, are centrifuged in each case; the solution left after centrifuging mainly contains the substance acting on the uterus:

|  | Substance acting on the uterus | Substance acting on the blood-pressure |
|---|---|---|
| (a) | 40 units | 2 units |
| (b) | 40 units | 5 units |
| (c) | 60 units | 5 units |
| (d) | 60 units | 5 units |

This series of tests shows that there are losses of substance acting on the uterus at (a) and (b), but no losses at (c) and (d), whilst the two substances are separated to the greatest extent at (a). A still better separation can then be obtained at (c) and (d) by again treating the solution with a small quantity of bentonite.

The centrifuged adsorbate is first extracted while heating on the water bath with 0.25% of acetic acid, whereby the substance adsorbed which acts on the uterus passes into solution, whilst the substance acting on the blood-pressure is not dissolved. The whole is then elutriated with a sodium carbonate solution of 1 percent strength, and the substance acting on the blood-pressure is thus obtained in a purified form.

(2). A solution free from albumin of the active substances of the posterior lobe of the hypophysis is, as described in Example (1), treated at pH=6.2 with various proportions of a purified clay preparation, and according to the result of the pre-examination, the suitable quantity of the adsorbent is used for the main test. The further treatment is carried out as indicated in Example (1).

(3). A solution free from albumin of the active substance of the posterior lobe of the hypophysis is treated at pH=3.5 with various quantities of a preparation of silicic acid, for instance silicic acid purified by an electrodialytical process, and the suitable quantity of the adsorbent is thus found with which the main test is then carried out in the same manner as in Example (1).

We claim:

1. The process of separating and isolating the substances of the posterior lobe of the hypophysis acting on the uterus from those acting on the blood-pressure which consists in treating the solution containing a mixture of the active substances with adsorbing substances of the group consisting of preparations of silicic acid or of silicates in a feebly acid solution, separating the filtrate containing the substance acting on the uterus from the adsorbent and treating the latter at first with a feeble acid and washing out the substance acting on the blood-pressure from the adsorbent by means of a weakly alkaline solution.

2. The process of separating and isolating the substances of the posterior lobe of the hypophysis acting on the uterus from those acting on the blood-pressure, which consists in treating the solution containing a mixture of the active substances with bentonite at a pH value of 4.0–7.0, separating the filtrate containing the substance acting on the uterus from the adsorbent and treating the latter at first with a feeble acetic acid solution and washing out the substance acting on the blood-pressure from the adsorbent by means of a weakly alkaline solution.

3. The process of isolating the substance of the posterior lobe of the hypophysis acting on the uterus, which consists in treating the solution containing a mixture of the active substances of the posterior lobe with bentonite at a pH value of 4.0–7.0, preferably at pH=6.4 and separating the adsorbent from the solution containing the substance acting on the uterus.

4. The process of isolating the substance of the posterior lobe of the hypophysis acting on the blood-pressure, which consists in treating the solution containing a mixture of the active substances of the posterior lobe with bentonite at a pH value of 4.0–7.0, preferably at pH=6.4, filtering the adsorbent, treating it with a weak solution of acetic acid and washing out the substance acting on the blood-pressure from the adsorbent by means of a solution containing 1 per cent of sodium carbonate.

MAX BOCKMÜHL.
FRITZ LINDNER.
OTTO SCHAUMANN.